Patented May 31, 1938

2,118,826

UNITED STATES PATENT OFFICE 2,118,826

METHOD OF MAKING QUINONE DI-IMIDES

Waldo L. Semon, Silver Lake, Ohio, assignor to The B. F. Goodrich Company, New York, N. Y., a corporation of New York No Drawing. Application October 27, 1936, Serial No. 107,802

7 Claims. (Cl. 260—56)

This invention relates to the art of manufacturing organic chemicals, and has for its object to provide an improved method for the manufacture of quinone di-imides from aromatic secondary amines.

Heretofore this reaction has been performed in solution, using an oxidizing agent such as an alkaline potassium permanganate solution. Some of the yield was always lost during the recovery and purification of the product.

I have discovered that certain secondary aromatic amines may be smoothly oxidized to quinone di-imides by exposing them to the air in the presence of an alkali. Since most of the secondary amines are rather high melting solids they are most easily exposed to the air by grinding, and become converted to the quinone di-imides as fast as fresh surfaces are exposed. Certain materials such as copper, cobalt, iron or lead salts and oxides catalyze the reaction. A solvent may be present, but it is a great advantage of my method that it is not needed to secure a smooth reaction.

As a specific example of my invention, I will illustrate how I prepare N,N' diphenyl-p-benzoquinone di-imide. I grind together in a ball mill gently heated by a small flame N,N' diphenyl-p-phenylene diamine 260 g. (1.0 mol.) and sodium hydroxide 10 g. (0.25 mol.) for about six hours. The melting point first drops to 130° C., then rises slowly to a maximum of 180° C. The product is then removed and washed with water. There is secured a quantitative yield of N,N' diphenyl-p-benzoquinone di-imide. The reaction is represented by the following:

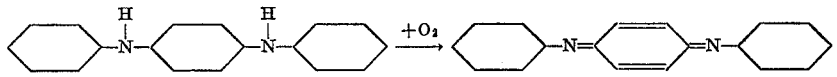

As another example of my invention, I grind N,N' di-β-naphthyl-p-phenylenediamine with a small amount of sodium hydroxide and lead oxide, and then heat the mixture at a temperature of about 135° C. for about eight hours. The formation of the N,N' di-β-naphthyl-p-benzoquinone di-imide, a brick red product melting above 345° C. is represented by the following:

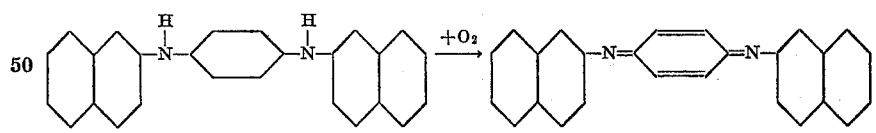

Heat is not essential to this method, but it causes the reaction to proceed more vigorously.

I have oxidized N,N' diphenyl-p-phenylene diamine to N,N' diphenyl-p-benzoquinone di-imide by grinding it in a mortar at room temperature with sodium hydroxide and cupric chloride. This reaction works equally well when sodium carbonate is substituted for sodium hydroxide.

A wide variety of secondary aromatic amines will undergo this reaction. Any secondary aromatic amine may be selected as the starting compound which falls in the class represented by the general formula:

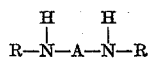

where R is a radical selected from the class consisting of aryl, alkoxyaryl, and halogen-substituted aryl groups, and A is an arylene group capable of assuming a quinoid structure. By aryl, I mean any univalent aromatic hydrocarbon radical, as phenyl or tolyl, whose free valence belongs to the nucleus and not to a side chain. Whether the arylene group is capable of assuming a quinoid structure depends upon the relative position of the nitrogen atoms. For instance, the nitrogen atoms must be ortho or para to each other on a benzene nucleus and 1,2; 1,4; or 2,6 on a naphthalene nucleus.

To illustrate the wide application of this method, I will list some of the compounds which may be prepared by this reaction. Besides the two heretofore mentioned, these include: N,N' diphenyl-o-benzoquinone di-imide; N,N'-di-isobutyl-p-phenyl-p-benzoquinone di-imide; N,N' di-p-xenyl-p-benzoquinone di-imide; N,N'-di-α-naphthyl-p-benzoquinone di-imide; N,N'-diphenyl-napthaquinone 2,6) di-imide; N,N'-di-p-anisyl-p-benzoquinone di-imide; N,N'-diphenyl 2-phenylbenzoquinone-(1,4) di-imide; N,N'-diphenyl tolu-p-quinone di-imide; and N,N'-diphenyl diphenoquinone-(4,4') di-imide. All of these compounds are valuable as antioxidants, as disclosed in my copending application, Serial No. 38,806, filed August 31, 1935.

In the term "alkali", I wish to include the oxides, hydroxides, amides and carbonates of sodium and potassium as well as oxides and hydroxides of the alkaline earth metals.

I claim:

1. The method of making quinone di-imides which comprises oxidizing in the air in the presence of alkali a secondary aromatic amine of the

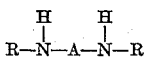

formula, where R is a radical selected from the class consisting of hydrocarbon aryl and alkoxyaryl groups, and A is an arylene group capable of assuming a quinoid structure.

2. The method of making quinone di-imides which comprises grinding in the air in the presence of alkali a secondary aromatic amine of the

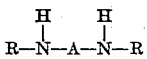

formula, where R is a radical selected from the class consisting of hydrocarbon aryl and alkoxyaryl groups, and A is an arylene group capable of assuming a quinoid structure.

3. The method of making quinone di-imides which comprises grinding and heating in the air in the presence of alkali a secondary aromatic amine of the

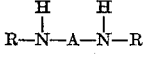

formula, where R is a radical selected from the class consisting of hydrocarbon aryl and alkoxyaryl groups, and A is an arylene group capable of assuming a quinoid structure.

4. The method of making quinone di-imides which comprises oxidizing in the air in the presence of alkali a secondary aromatic amine of the

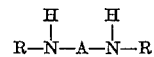

formula, where R is an hydrocarbon aryl group and A is an arylene group capable of assuming a quinoid structure.

5. The method of making quinone di-imides which comprises grinding in the air in the presence of alkali a secondary aromatic amine of the

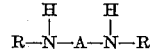

formula, where R is an hydrocarbon aryl group and A is an arylene group capable of assuming a quinoid structure.

6. The method of making quinone di-imides which comprises grinding and heating in the air in the presence of alkali a secondary aromatic amine of the

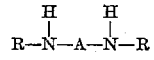

formula, where R is an hydrocarbon aryl group and A is an arylene group capable of assuming a quinoid structure.

7. The method of making N,N' diphenyl-p-benzoquinone di-imide which consists of grinding and heating N,N' diphenyl p-phenylene diamide in the air in the presence of alkali.

WALDO L. SEMON.